(12) United States Patent
Cathey, Jr.

(10) Patent No.: US 6,417,950 B1
(45) Date of Patent: Jul. 9, 2002

(54) THREE-COLOR IMAGING ON EACH PIXEL FOR INCREASED RESOLUTION

(75) Inventor: Wade Thomas Cathey, Jr., Boulder, CO (US)

(73) Assignee: University Technology Corporation, Boulder, CO (US)

( * ) Notice: Subject to any disclaimer, the term of this patent is extended or adjusted under 35 U.S.C. 154(b) by 36 days.

(21) Appl. No.: 09/649,118

(22) Filed: Aug. 28, 2000

(51) Int. Cl.$^7$ ................................................. G02F 1/00
(52) U.S. Cl. ....................................... 359/237; 359/247
(58) Field of Search ................................ 359/305, 247, 359/246, 618, 495, 237; 349/95, 42; 257/247, 246, 618, 59, 495, 237; 345/87

(56) References Cited

U.S. PATENT DOCUMENTS

| | | | |
|---|---|---|---|
| 4,349,277 A | | 9/1982 | Mundy et al. ............... 356/376 |
| 6,208,451 B1 | * | 3/2001 | Itoh ............................ 359/247 |
| 6,218,679 B1 | * | 4/2001 | Takahara et al. .............. 257/59 |
| 6,219,113 B1 | * | 4/2001 | Takahara ..................... 349/42 |
| 6,172,723 B1 | * | 6/2001 | Inoue et al. .................. 349/95 |
| 6,172,799 B1 | * | 6/2001 | Raj ............................. 359/305 |
| 6,285,345 B1 | * | 9/2001 | Crossland et al. ............ 345/87 |

FOREIGN PATENT DOCUMENTS

EP 0981245 2/2000

OTHER PUBLICATIONS

Wei, H. and T. D. Binnie. Abstract for "High-Resolution Image Reconstruction for Multiple Low-Resolution Images," from the Seventh International Conference on Image Processing and its Applications (Conf. Plub. No. 465), vol. 2, 1999, pp. 596–600.

Chen, Qin–Sheng and M.S. Weinhous. Abstract for "Sub–Pixel Shift with Fourier Transform to Achieve Efficient and High Quality Image Interpolation," from the Proceedings of the SPIE—The International Society for Optical Engineering, vol. 3661, pt. 1–2, 1999, pp.728–736.

Clarence Wust and David W. Capson. Abstract for "Surface Profile Measurement Using Color Fringe Projection," from the Machine vision and applications, (1991) 4:1993–203.

Masahiro Kawakita, Keigo Iizuka, Tahito Aida, Hiroshi Kikuchi, Hideo Fujikake, Jun Yonai and Kuniharu Takizawa. Abstract for "Axivision Camera: a Three–dimension Camera," from the Three–Dimensional Image Capture and Applications iii, proceedings of SPIE vol. 3958 (2000).

* cited by examiner

*Primary Examiner*—Ricky Mack
*Assistant Examiner*—Omar Hindi
(74) *Attorney, Agent, or Firm*—Jennifer L. Bales; Macheledt Bales LLP (57) ABSTRACT

Apparatus for increasing color resolution and quality in digital imaging systems temporally modulates red, green and blue light, detects all three colors at each pixel, and band pass filters the detected light to extract values for red, green and blue at each pixel. A detector which preserves the modulation, such as a complementary metal oxide semiconductor detector is used. Alternatively, if an integrating detector array such as a charge coupled device (CCD) is used, the three illumination sources are switched on and off sequentially, and the detector array switches to different integrating circuits for each color. Measurement of the range provides full color, three-dimensional, image data.

8 Claims, 8 Drawing Sheets

| R1 | G1 | R2 | G2 | R3 | G3 |
|----|----|----|----|----|----|
| G4 | B1 | G5 | B2 | G6 | B3 |
| R4 | G7 | R5 | G8 | R6 | G9 |
| G10| B4 | G11| B5 | G12| B6 |
| R7 | G13| R8 | G14| R9 | G15|
| G16| B7 | G17| B8 | G18| B9 |

Figure 1 (Prior Art)

| R1245  | R25  | R2356 |
|--------|------|-------|
| B1     | B12  | B2    |
| G1457  | G5   | G56   |

THREE-COLOR IMAGING ON EACH PIXEL FOR INCREASED RESOLUTION

BACKGROUND OF THE INVENTION

1. Field of the Invention

The present invention relates to methods and apparatus for eliminating the need for color interpolation in single-array digital imaging systems by detecting modulated red, green and blue light at each pixel, and band pass filtering the detected light to extract signals representing red, green and blue.

2. Description of the Prior Art

Figure 1:
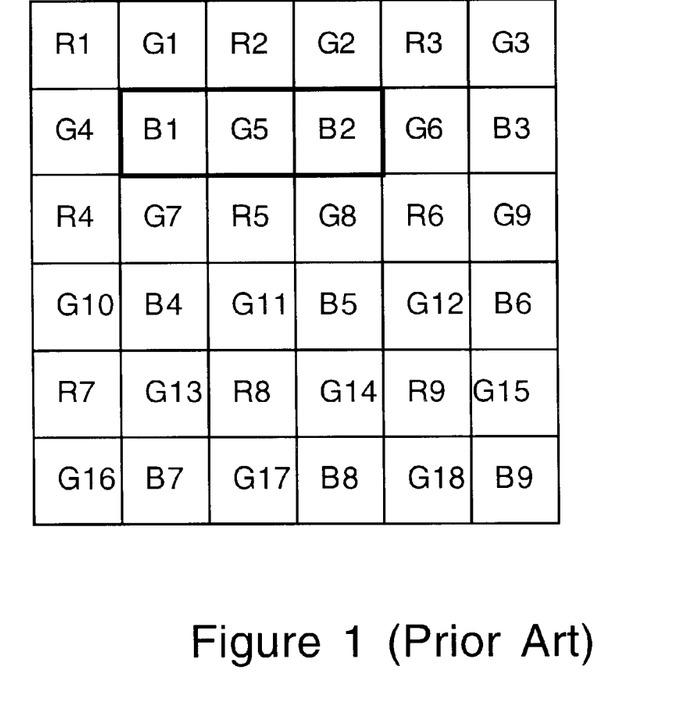
FIG. 1 (prior art) shows an image obtained by a detector array through the color filter array.

In digital cameras, there are three generally accepted methods for acquiring color images using a light detector array. The first method is to put a color filter array (CFA) over the detector array, such that certain pixels detect certain colors. For example, some of the pixels would detect red light, some of the pixels would detect green light, and some of the pixels would detect blue light. The result of using such a color filter is that each pixel in the array sees only one color, so to obtain a full color image, interpolation must be used to estimate the other two colors at each pixel location. FIGS. 1A and 1B (prior art) show how this method is used. The image obtained by the detector array through the color filter array has an arrangement of red pixels, blue pixels, and green pixels, for example in the Bayer CFA pattern, as shown in FIG. 1A. The intensity at each pixel indicates how much of the selected color of light was detected. In FIG. 1B all of the pixels have all three colors of light, because the green light is interpolated between pixel G1 and pixel G4 to determine the intensity of green light in the upper left hand pixel, and so on. Thus, each three color pixel is only really accurate with respect to one of the three colors. In addition, each color array is sparsely filled. This decreases the sample rate at each color and causes increased aliasing in the image.

Figure 2:
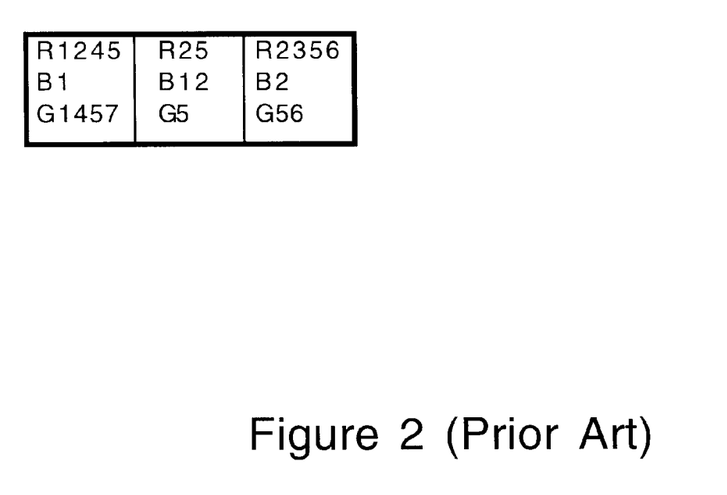
FIG. 2 (prior art) shows the reconstructed three-color image from interpolating the pixels of the image of FIG. 1A.
Figure 3:
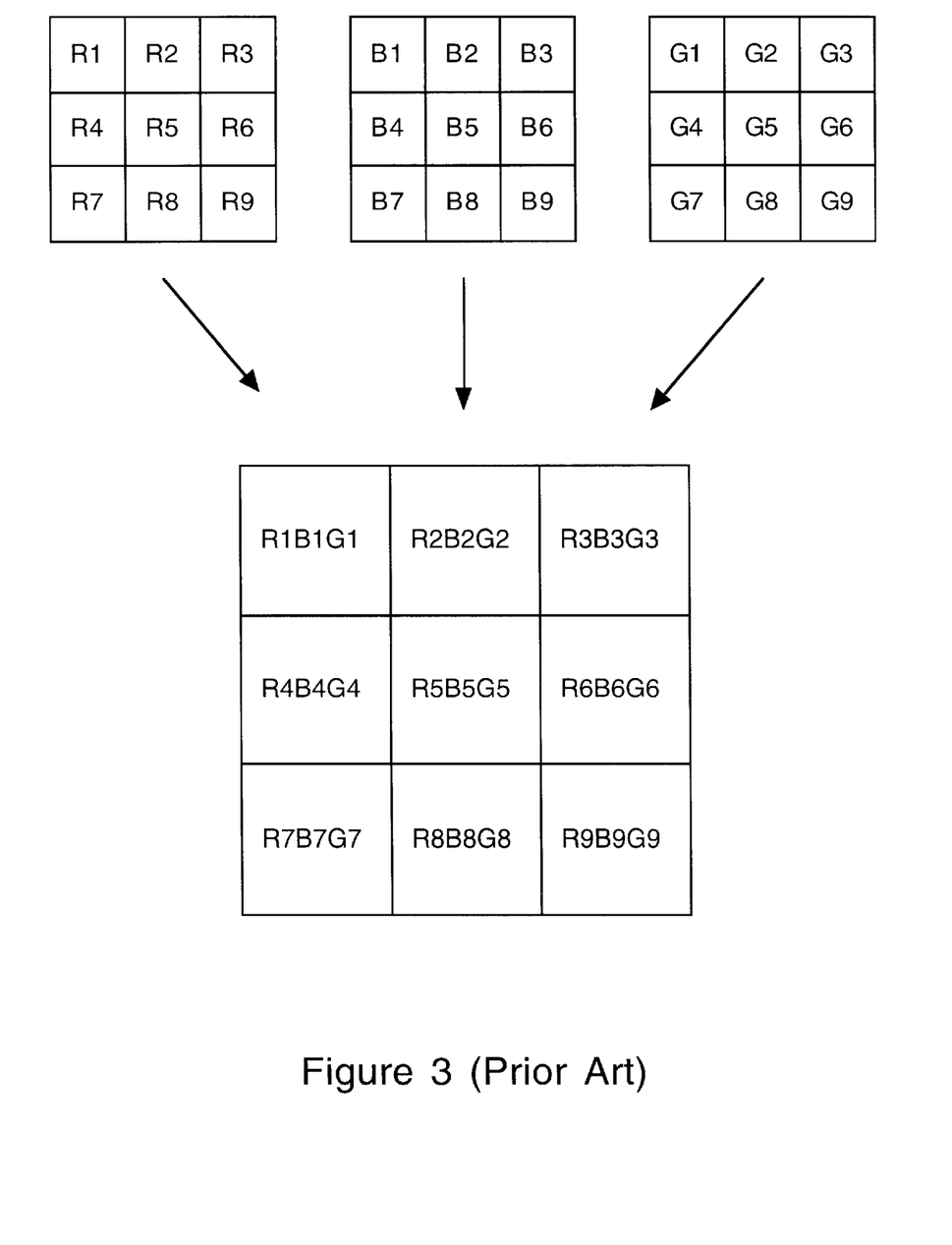
FIG. 3 (prior art) indicates how the three one-color images are overlapped to reconstruct a three-color image.

The second method is more expensive, and more accurate with respect to color. Three separate detector arrays are used, one for each color. Thus three images, one for each color, are formed. Then the three images are overlapped to give a composite full color image. The grey scale resolution is no better than the first method, but the accuracy of the colors is greater. FIG. 2 (prior art) indicates how the three images are overlapped to generate an accurate three-color image. In addition, each array has a 100% fill factor (ratio of pixel size to pixel spacing), meaning there is little or no dead space between pixels. Consequently, aliasing is minimized.

The third method is to use a color filter wheel so that only one color illuminates the object at a time. This has the disadvantage that the field rate must be tripled to give the same frame rate. In addition, if the object moves during the exposure, the image acquires color artifacts. For example, a black/white edge appears as a color edge.

A need remains in the art for methods and apparatus for increasing resolution and color accuracy in digital imaging systems without the need for employing multiple detector arrays, by temporally modulating red, green and blue light, detecting all three colors at each pixel, and band pass filtering the detected light to extract signals related to red, green and blue at each pixel.

SUMMARY OF THE INVENTION

It is an object of the present invention to provide methods and apparatus for increasing resolution and color accuracy in digital imaging systems without the need for employing multiple detector arrays, by temporally modulating red, green and blue light, detecting all three colors at each pixel, and band pass filtering the detected light to extract values for red, green and blue at each pixel.

This is accomplished by sinusoidally modulating red, green and blue light sources at different frequencies. The modulation can be performed, for example, by modulating the current of the light source. The detector array detects all three colors of light at each pixel. A detector which preserves the modulation, such as a complementary metal oxide semiconductor detector is used. Three band pass filters, centered at the three modulating frequencies, are used to extract the signal associated with each color.

Alternatively, if an integrating detector array such as a charge coupled device (CCD) is used, the three illumination sources can be switched on and off sequentially, and the output read out for each color, at different times. The switching must be at three times the frame rate.

The present invention is useful in devices where artificial illumination is used, such as microscopes, endoscopes, color scanners, and manufacturing inspection cameras.

DETAILED DESCRIPTION OF THE PREFERRED EMBODIMENTS

Figure 4:
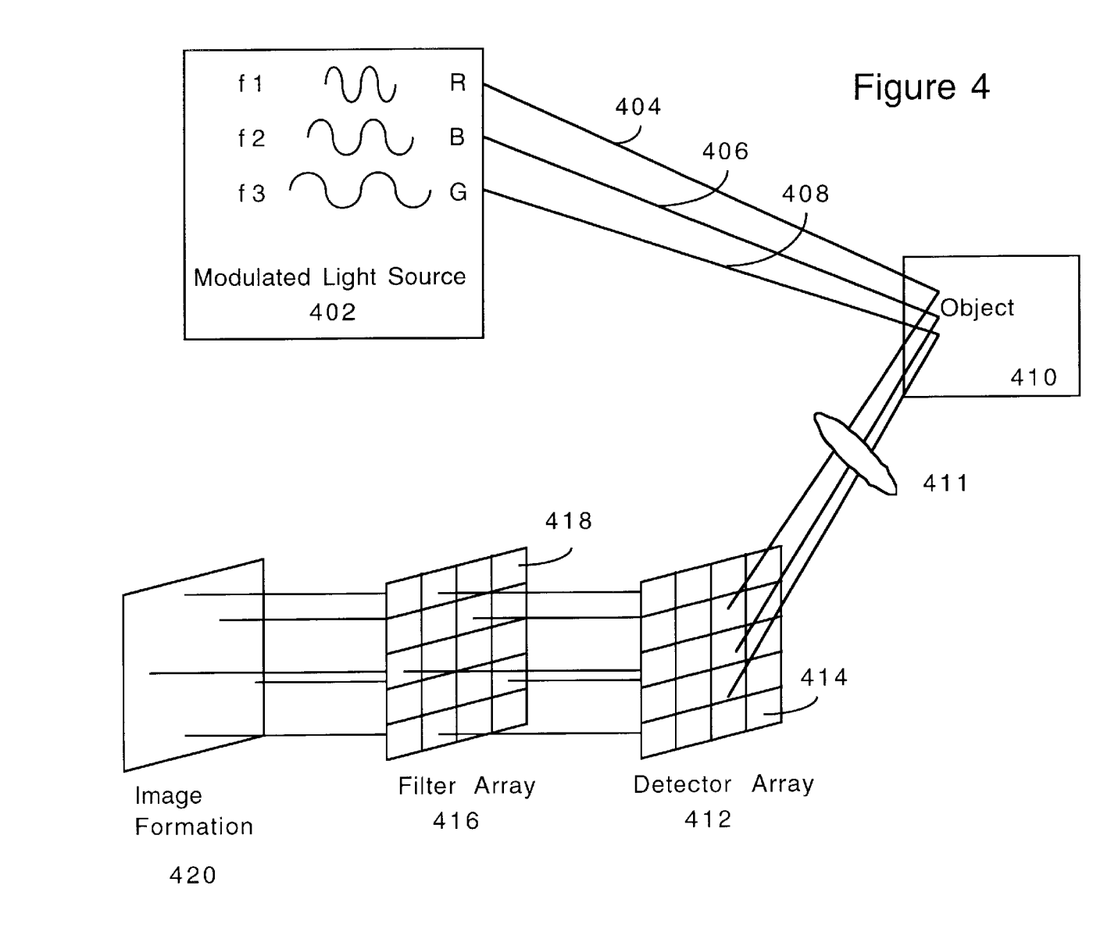
FIG. 4 is a block diagram showing three-color imaging at each pixel according to a first embodiment of the present invention wherein the colors of light is modulated.

FIG. 4 is a block diagram showing three-color imaging at each pixel according to a first embodiment of the present invention wherein each color of light is modulated at a different frequency. Modulated light source 402 modulates red, blue and green light at three different frequencies. The modulated light 404, 406, 408 is reflected off object 410, imaged by lens 411, and detected by detector array 412. Detector array 412 detects all three colors of light at each pixel 414. A detector which preserves the modulation, such as a complementary metal oxide semiconductor detector is used. A band pass filter array 416 is used to extract the signal associated with each color at each pixel. Each filter element 418 comprises three band pass filters tuned to the three frequencies used to modulate the three colors of light. The signal passed by each filter element then represents the amount of light of a particular color seen by that pixel. CMOS detectors have the advantage (in addition to preserving the modulation) that the filter circuits could be built on the same semiconductor chip as the detectors. Image forming element 420 combines values for each color at each pixel and forms a three-color image of the object.

Figure 5:
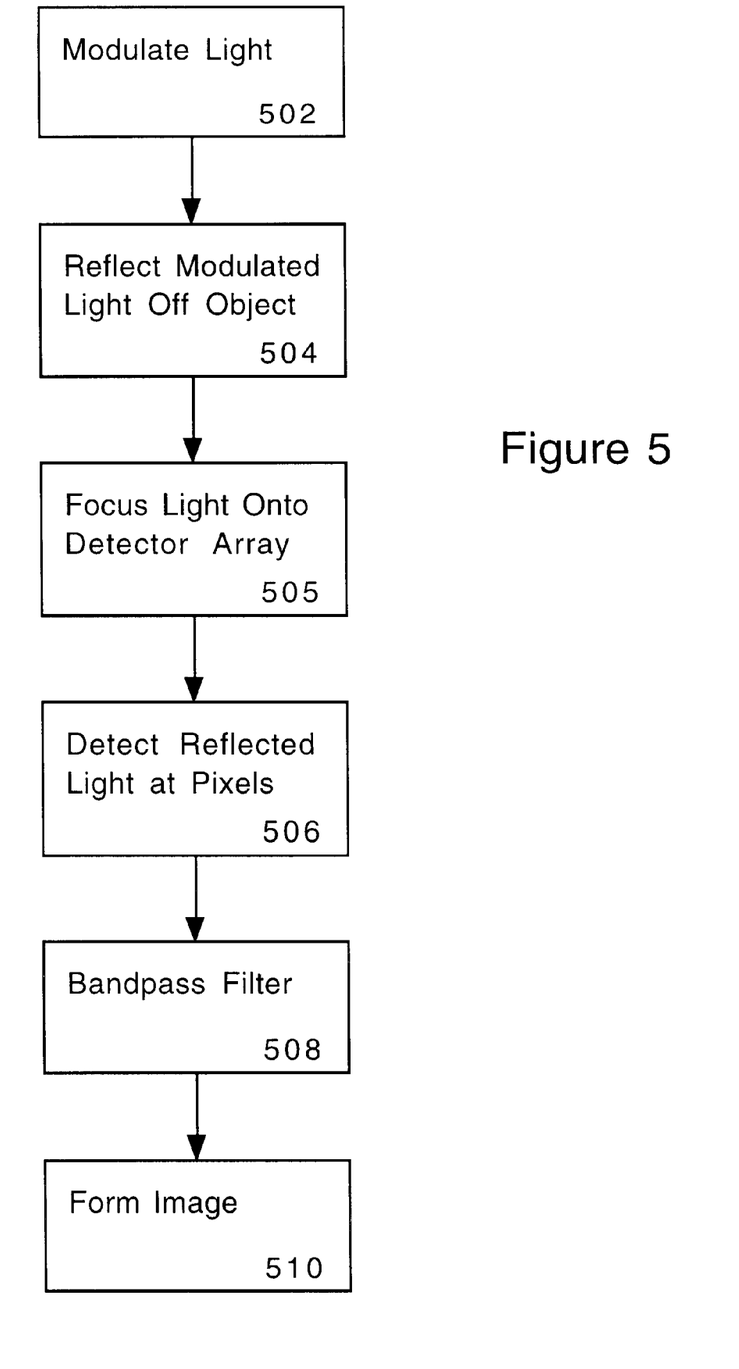
FIG. 5 is a flow diagram showing the process of three-color imaging at each pixel according to the embodiment of FIG. 4.

FIG. 5 is a flow diagram showing the process of three-color imaging at each pixel according to the embodiment of FIG. 4. In step 502, the different colors of light are modulated by different frequencies (in general three colors of light, red, green, and blue, are used). The modulated light is reflected off of the object to be imaged in step 504. The reflected light is is imaged by lens 411 in step 505 and is detected at each pixel of the detector array 412 in step 506. In step 508, the signal from each pixel is passed through band pass filters 416 tuned to the modulating frequencies in order to extract the signal related to each color of light. The image is formed with values for all of the colors at each pixel in step 510.

Figure 6:
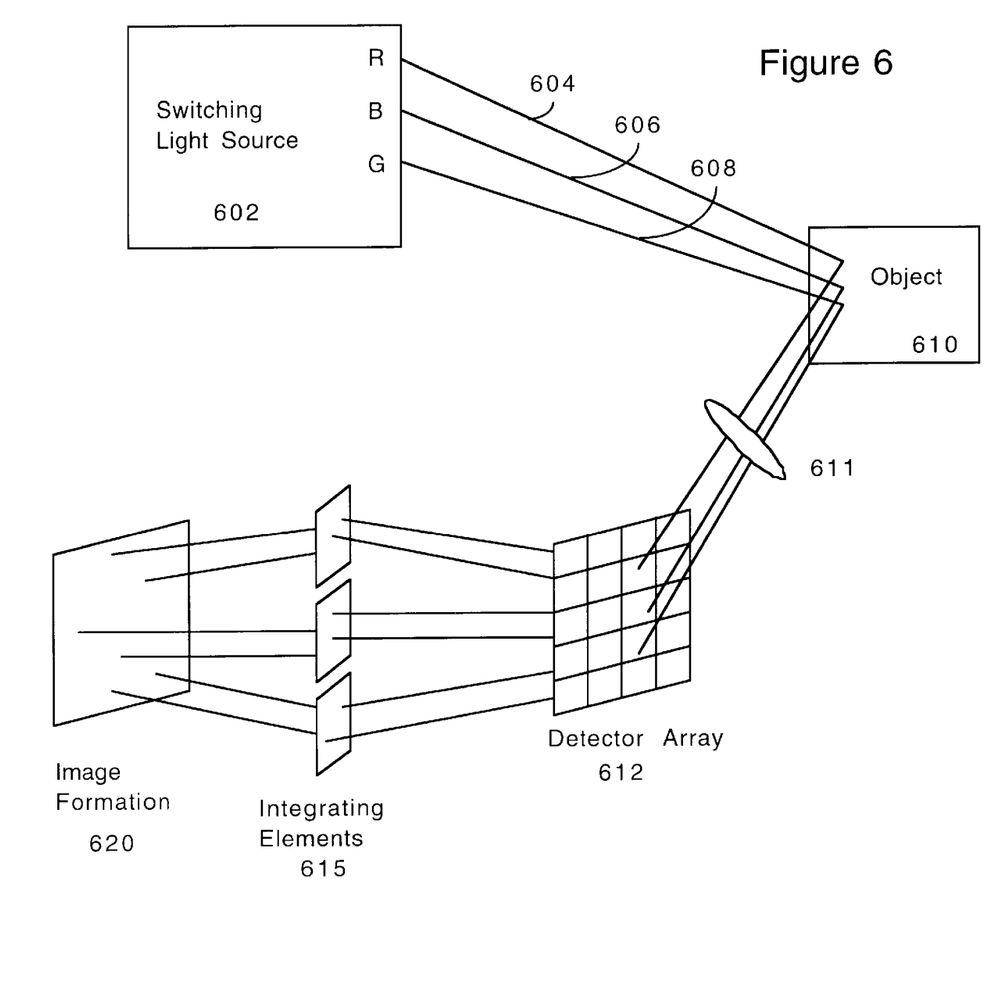
FIG. 6 is a block diagram showing three-color imaging at each pixel according to a second embodiment of the present invention wherein the colors of light are sequentially switched during one frame.

FIG. 6 is a block diagram showing three-color imaging at each pixel according to a second embodiment of the present invention, wherein each color of light is switched sequentially. Switching light source 602 switches between providing red, blue and green light sequentially. The light is reflected off object 610, imaged by lens 611, and detected by detector array 612. Detector array 612 is an integrating type array, so in order to preserve the information as to which color was detected as a particular time, three integrators or storage elements 615 are selected as the light source switches between colors. Image forming element 620 forms an image of the object, which has values for each color at each pixel from the three integrator arrays.

Figure 7:
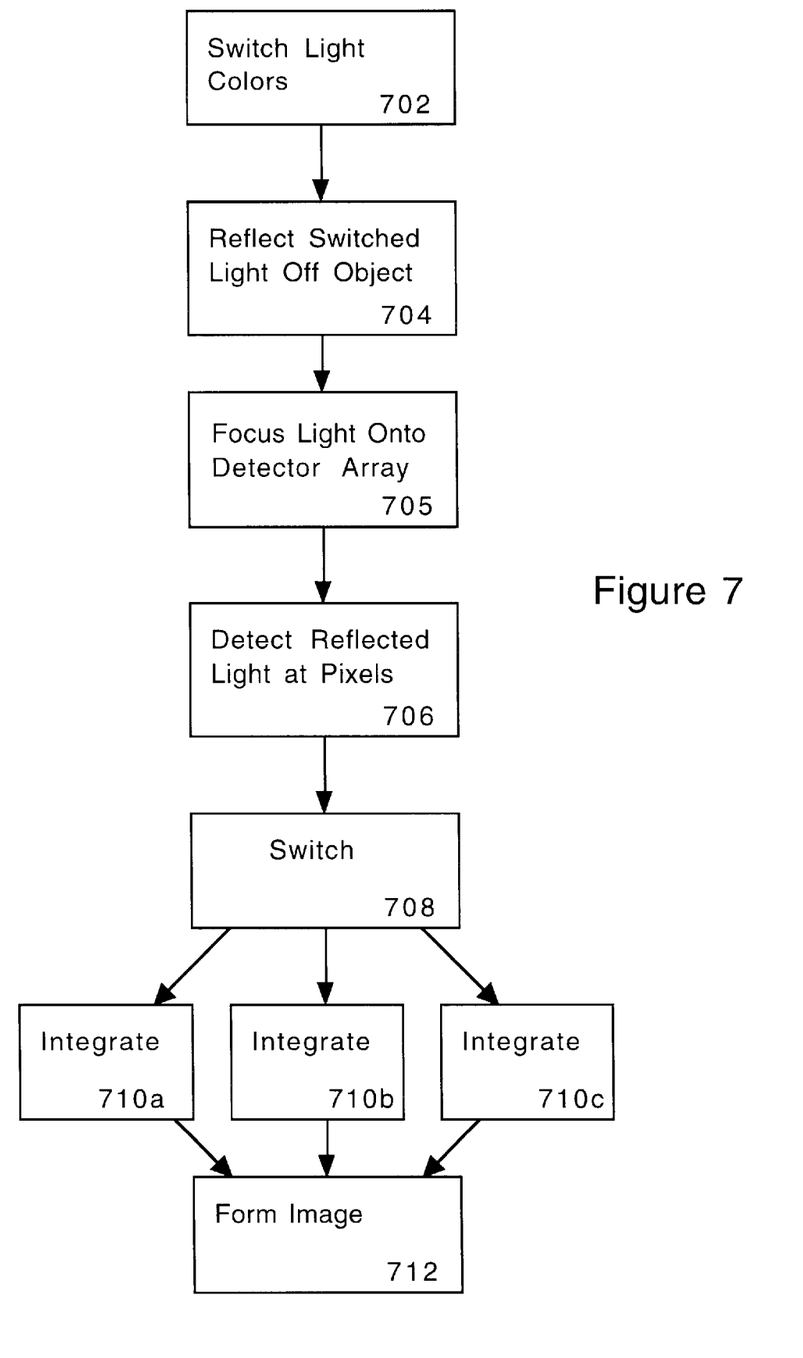
FIG. 7 is a flow diagram showing the process of three-color imaging at each pixel according to the embodiment of FIG. 6.

FIG. 7 is a flow diagram showing the process of three-color imaging at each pixel according to the embodiment of FIG. 6. In step 702, the different colors of light are switched during one frame. The light is reflected off of the object to be imaged in step 704, and is imaged onto the detector array in step 705. The reflected light is detected at each pixel of the detector array in step 706. In step 708, the signals from the detector array are switched to the correct integrator array for the color of light provided. The signals are integrated in steps 710. The image is formed with values for all of the colors at each pixel in step 712.

Figure 8:
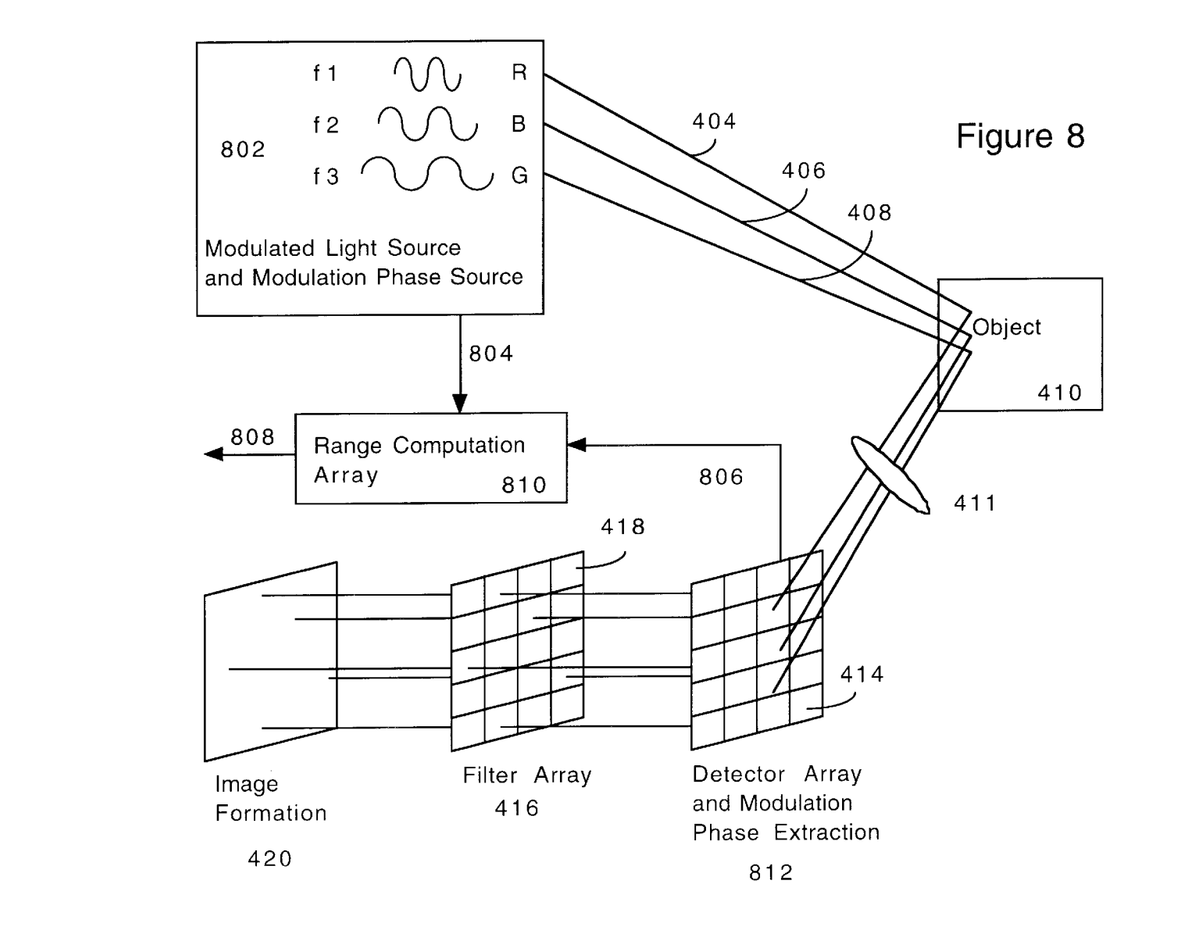
FIG. 8 is a block diagram showing the embodiment of FIG. 4, further including a first embodiment of ranging apparatus.

FIG. 8 shows a modification to the embodiment of FIG. 4 which allows the system to also detect object range, using the modulation phase of at least one color of light. This feature is useful in endoscopes, manufacturing inspection, and the like. Modulated light source 802 now also provides the modulation phase of at least one of the three modulated colors as signal 804. Detector 812 also extracts the modulation phase of the same color(s) detected in each pixel and provides it as signal 806. Range computation array 810 detects the offset in modulation phase between light source 802 and after reflection off object 410, and computes the range to each imaged segment of object 410. While detecting offset in the modulation phase of only one color is necessary, detecting offset in modulation phase of more that one color may be useful for double checking the range or in resolving range ambiguities. If the phase has been offset by more than one wavelength of the modulation, there is an n2π phase ambiguity. This ambiguity can be resolved by making measurements of the phase at different modulation wavelengths, as long as the modulation wavelengths are not integral multiples of each other.

Figure 9:
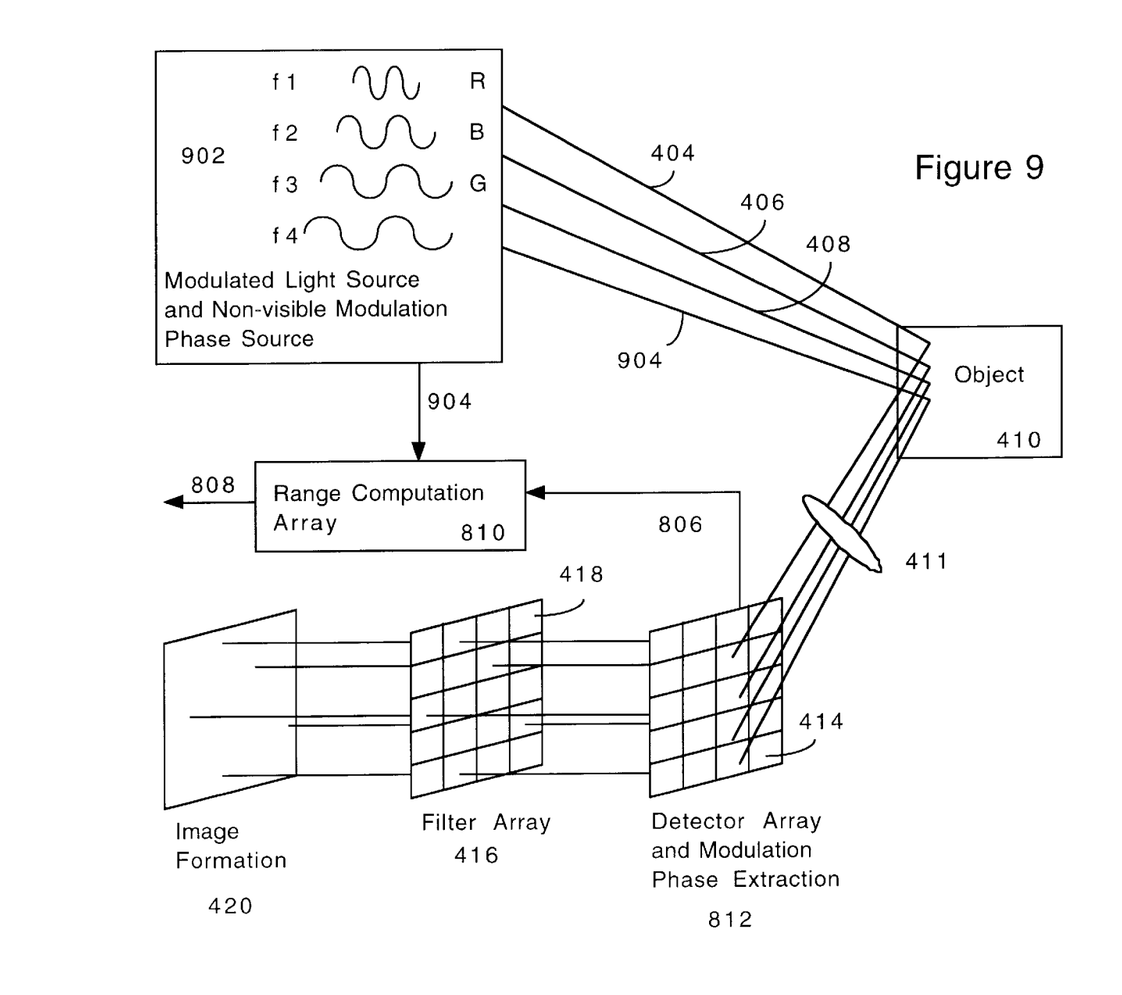
FIG. 9 is a block diagram showing the embodiment of FIG. 4, further including a second embodiment of ranging apparatus.

FIG. 9 shows the measurement of range by modulating a nonvisible portion of the spectrum (e.g. infrared) with a modulation wavelength to form ranging signal 904. Measurement of the phase offset of signal 904 is then accomplished as described with respect to FIG. 8. Measurement of offset in one of the colors (or another modulated infrared signal) could be used to remove range ambiguities.

Those skilled in the art will appreciate that many other configurations fall within the spirit and scope of the present invention.

What is claimed is:

1. Apparatus for improved color imaging comprising:
   means for sinusoidally modulating at least two different colors of light;
   means for reflecting the modulated light off of an object to be imaged;
   means for detecting the modulated reflected light at a plurality of pixels and generating a signal related to the detected light at each pixel, the detecting means including means for preserving the modulation;
   means for filtering the signal at each pixel, in order to separate out the values of the signal related to each light color at each pixel according to its modulation; and
   means for forming an image, the image forming means combining the values of the signal related to each light color at each pixel.

2. The apparatus of claim 1, wherein the means for detecting comprises a CMOS detector array.

3. The apparatus of claim 1, wherein three colors of light are modulated.

4. The apparatus of claim 1, further including means for computing range to at least one portion of the object by comparing modulation phase of at least one color of light at the modulating means with modulation phase of the at least one color of light at a pixel of the detector array corresponding the the object portion after reflection off the object.

5. The apparatus of claim 1, further including means for computing range to the object comprising:
   means for sinusiodally modulating a nonvisible portion of the light spectrum to generate a range signal;
   means for transmitting the range signal along the same path as the modulated light; and
   means for comparing modulation phase of the range signal at the modulating means with modulation phase of the range signal at pixels of the detector array after reflection off the object.

6. Apparatus for improved color imaging comprising:
   means for switching periodically between at least two different colors of light transmitted;
   means for reflecting the light off of an object to be imaged;
   means for detecting the reflected light at a plurality of pixels and generating a signal related to the detected light at each pixel;
   means for sequentially integrating the signal at each pixel, according to the period of each switched color, and generating a signal related to each light color at each pixel; and
   means for forming an image, the image forming means combining the values of the signal related to each light color at each pixel.

7. The apparatus of claim 6, wherein the means for detecting comprises a CCD array.

8. The apparatus of claim 6, wherein three colors of light are modulated.

* * * * *